(12) United States Patent
Shima

(10) Patent No.: US 6,547,438 B2
(45) Date of Patent: Apr. 15, 2003

(54) HYDRAULIC BEARING DEVICE

(75) Inventor: Toshihiko Shima, Okazaki (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 09/960,336

(22) Filed: Sep. 24, 2001

(65) Prior Publication Data

US 2002/0081044 A1 Jun. 27, 2002

(30) Foreign Application Priority Data

Sep. 25, 2000 (JP) ......................... 2000-289889
Mar. 30, 2001 (JP) ......................... 2001-100989
Sep. 14, 2001 (JP) ......................... 2001-280095

(51) Int. Cl.[7] .............................................. F16C 32/06
(52) U.S. Cl. ........................................ 384/100; 384/118
(58) Field of Search ................................ 384/100, 107, 384/111, 113, 114, 118, 121, 123

(56) References Cited

U.S. PATENT DOCUMENTS

| 4,371,216 A | | 2/1983 | Suzuki et al. | |
|---|---|---|---|---|
| 5,433,528 A | * | 7/1995 | San Andres | 384/100 |
| 5,447,375 A | * | 9/1995 | Ochiai et al. | 384/100 |
| 5,480,234 A | * | 1/1996 | Chen et al. | 384/313 |
| 5,769,545 A | * | 6/1998 | Bently et al. | 384/118 |
| 5,816,104 A | | 10/1998 | Sugita et al. | |
| 5,833,522 A | | 11/1998 | Niino et al. | |
| 5,871,285 A | * | 2/1999 | Wasson | 384/118 |
| 5,928,061 A | | 7/1999 | Niino et al. | |

FOREIGN PATENT DOCUMENTS

| JP | 10-227312 | 8/1998 |
|---|---|---|
| JP | 10-259823 | 9/1998 |

* cited by examiner

*Primary Examiner*—Thomas R. Hannon
(74) *Attorney, Agent, or Firm*—Oblon, Spivak, McClelland, Maier & Neustadt, P.C.

(57) ABSTRACT

A hydraulic bearing device that supports a rotating shaft comprises a bearing metal. On a surface of the bearing metal, a hydrostatic pocket and a land portion are formed. The land portion is defined by the hydrostatic pocket and generates hydrodynamic pressure. The hydraulic bearing device further comprises a pressure fluid supplying source and an oil-supplying hole. The oil-supplying hole is opened in the hydrostatic pocket and provides pressure fluid from the pressure fluid supplying source to the hydrostatic pocket. On the land portion, a drain hole that drains the fluid is formed. Since the fluid is drained through the drain hole, thermal expansion of the bearing metal due to heat generation of the fluid is restrained. Moreover, since the drain hole does not separate the land portion, deterioration of bearing rigidity is restrained.

16 Claims, 16 Drawing Sheets

SEPARATED TYPE

NON-SEPARATED TYPE

NON-SEPARATED TYPE

NON-SEPARATED TYPE

NON-SEPARATED TYPE

SEPARATED TYPE

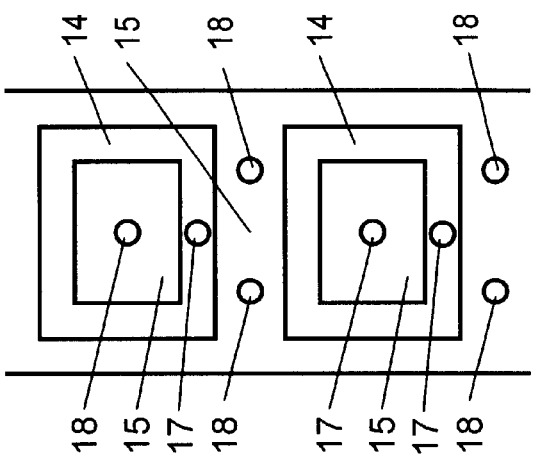
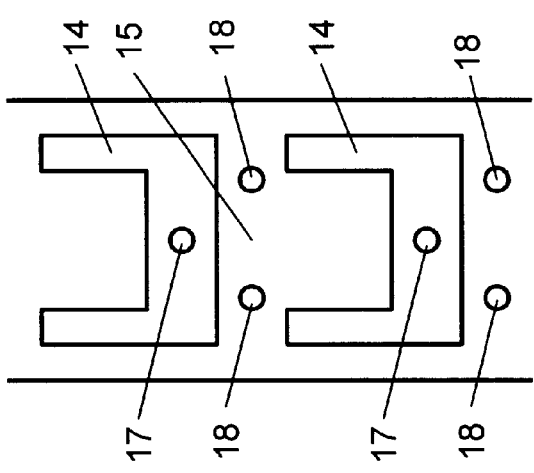
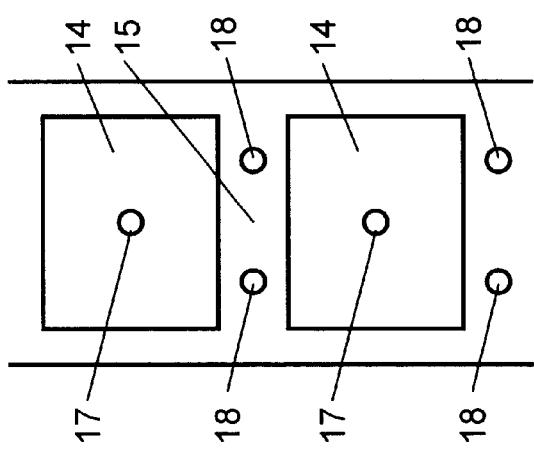

HYDRAULIC BEARING DEVICE

INCORPORATION BY REFERENCE

The entire disclosure of Japanese Patent Applications Nos. 2000-289889 filed on Sep. 25, 2000, 2001-100989 filed on Mar. 30, 2001 and 2001-280095 filed on Sep. 14, 2001 including specification, drawings and abstract is herein by reference in its entirety.

BACKGROUND OF THE INVENTION

1. Field of the Invention

The invention relates to a hydraulic bearing device that supports a rotating shaft or the like.

2. Description of the Related Art

FIG. 1 shows three partially developments of inner surfaces of bearing metals which constitute radial hydraulic bearing devices according to the related arts. Plural hydrostatic pockets 1, 2 that are quadrilateral grooves such as shown by FIGS. 1(A) and 1(C) or U-shaped grooves such as shown by FIG. 1(B) are formed on inner surface of the bearing metals along a rotational direction of a rotating shaft. An oil-supplying hole 3 is formed in each hydrostatic pocket. Inner surface of the bearing metal except the hydrostatic pockets are land portions 4 for generating hydrodynamic pressure. FIG. 2 shows three plane views of bearing metals which constitute thrust hydraulic bearing devices according to the related arts. A hydrostatic pocket 5 that is a ring shape groove such as shown by FIG. 2(A) or plural hydrostatic pockets 6 that are partially ring-shape grooves such as shown by FIGS. 2(B) and 2(C) are formed on a surface of the bearing metals. Plural oil-supplying holes 3 are formed in the ring shape hydrostatic pocket 5, and a oil-supplying hole 3 is formed in the each partly ring shape hydrostatic pocket 6. The surface of the bearing metal except the hydrostatic pockets 5, 6 are land portions 4 for generating hydrodynamic pressure. Here, hydraulic bearing devices are distinguished two types that are a separated type such as shown by FIG. 1(C) or FIG. 2(C), and a non-separated type such as shown by FIGS. 1(A), 1(B) or FIGS. 2(A), 2(B) according to a shape of the land portion 4. The land portion 4 of the non-separated type is continuously all around of the surface of the bearing metal. On the other hand, the land portions 4 of the separated type are separated to rotational direction by drain grooves 7 that are formed between each hydrostatic pocket. At aforementioned hydraulic bearings, when pressure adjusted lubricant oil is supplied to the hydrostatic pockets 1, 2, 5, 6 through the oil-supplying hole 3, the hydraulic bearing functions as a hydrostatic bearing by filled lubricant oil between the hydrostatic pockets 1, 2, 5, 6 of the bearing metal and an outer surface of a rotating shaft. Simultaneously, since the lubricant oil is filled between the land portion 4 and the rotating shaft, when the rotating shaft is rotated for the bearing metal, the hydraulic bearing functions as a hydrodynamic bearing by wedge effect that is generated between the land portions 4 and the outer surface of the rotating shaft.

Then, at the non-separated type bearing, especially in a case of U-shaped hydrostatic pockets 2 such as shown by FIG. 1(B), since area of the land portion 4 is large and continuously, a large amount of hydrodynamic pressure is generated. Therefore, the non-separated type bearing is effective in high rigidity and high damping effect. However, in a case of high rotating speed, a great heat due to fluid friction is generated at the land portion 4. The great heat causes thermal expansion of the bearing metal, and a clearance between the bearing metal and the rotating shaft decreases. As the result, calorific value by fluid friction increases, and thermal expansion of the bearing metal increases. This is in a vicious circle that causes to deteriorate the performance of the bearing.

On the other hand, at the separated type bearing, heat generating at the land portion 4 is restrained because it is easy to be drained the lubricant oil by existence of the drain grooves 7. However, existence of the drain grooves 7 causes deterioration of the rigidity because the land portion 4 is separated and small. Moreover, the separated type bearing tends to cause cavitation.

SUMMARY OF THE INVENTION

It is an object of the present invention to provide an improved hydraulic bearing device.

A hydraulic bearing device that supports a rotating shaft comprises a bearing metal. On a surface of the bearing metal, a hydrostatic pocket and a land portion are formed. The land portion is defined by the hydrostatic pocket and generates hydrodynamic pressure. The hydraulic bearing device further comprises a pressure fluid supplying source and an oil-supplying hole. The oil-supplying hole is opened in the hydrostatic pocket and provides pressure fluid from the pressure fluid supplying source to the hydrostatic pocket. On the land portion, a drain hole that drains the fluid is formed.

Because the hydraulic bearing device is provided with the hydrostatic pocket and the land portion, it functions not only as a hydrostatic bearing but also as a hydrodynamic bearing. Then, since the fluid is drained through the drain hole, thermal expansion of the bearing metal due to heat generation of the fluid is restrained. Moreover, since the drain hole does not separate the land portion, deterioration of bearing rigidity is restrained.

BRIEF DESCRIPTION OF THE DRAWINGS

Further objects, features and advantages of the present invention will become apparent from the following description of the preferred embodiments with reference to the accompanying drawings, wherein:

FIGS. 6(A), 6(B), and 6(C) are partially developments of inner surfaces of other bearing metals according to the first embodiment of the present invention;

DESCRIPTION OF PREFERRED EMBODIMENTS

First Embodiment

Figure 1C:
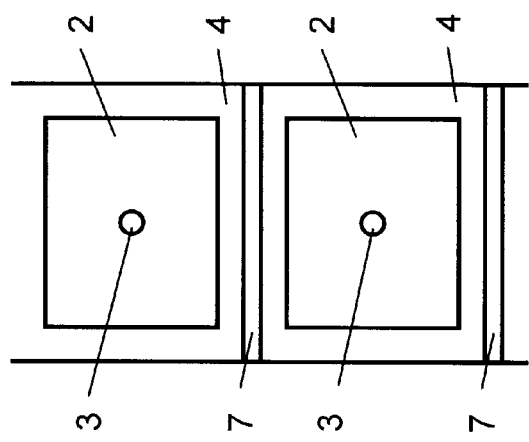
FIGS. 1(A), 1(B) and 1(C) are partially developments of inner surfaces of bearing metals that constitute radial hydraulic bearing devices according to the related arts.
Figure 1B:
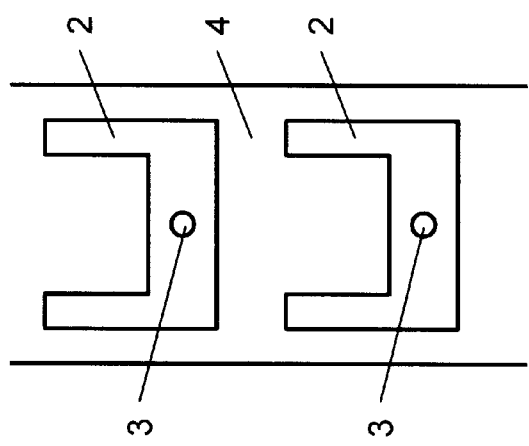
Figure 1A:
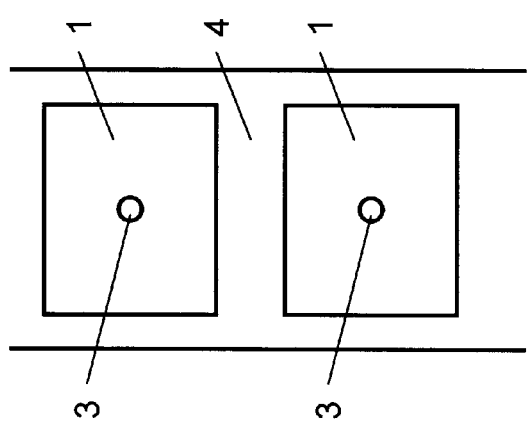
Figure 2A:
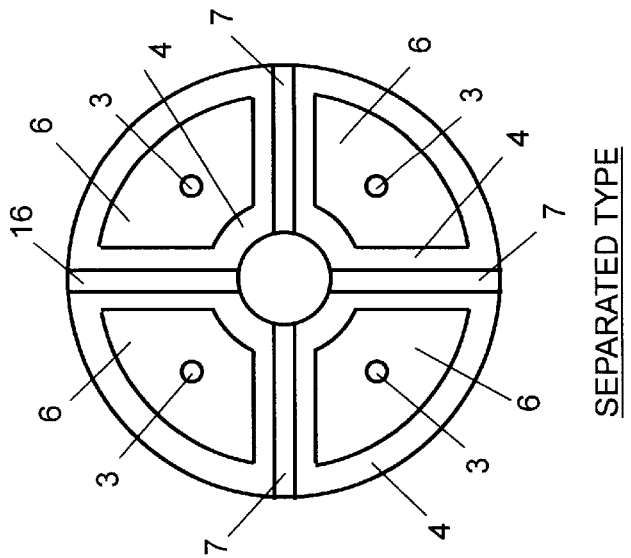
FIGS. 2(A), 2(B) and 2(C) are plane views of bearing metals that constitute thrust hydraulic bearing devices according to the related arts.
Figure 2B:
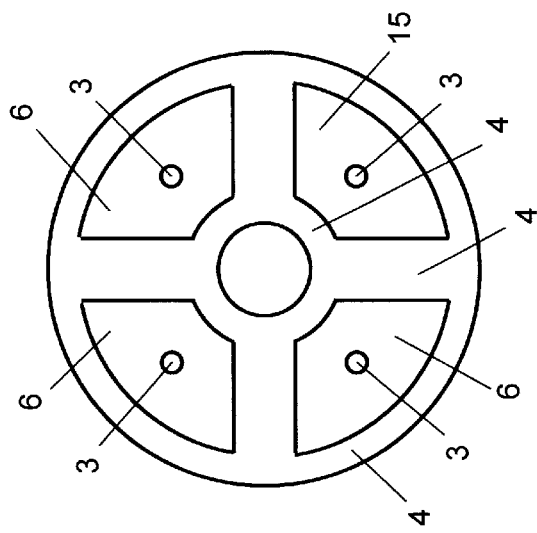
Figure 2C:
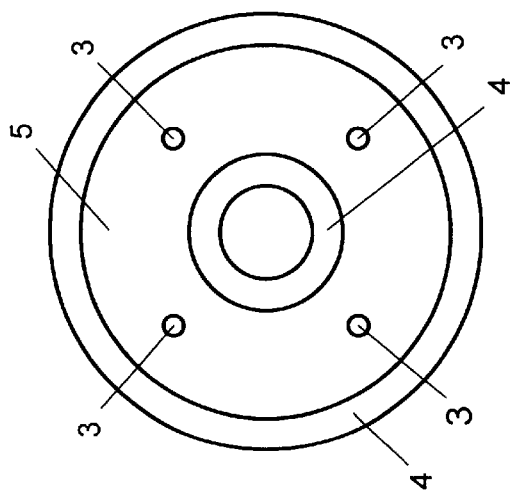
Figure 3:
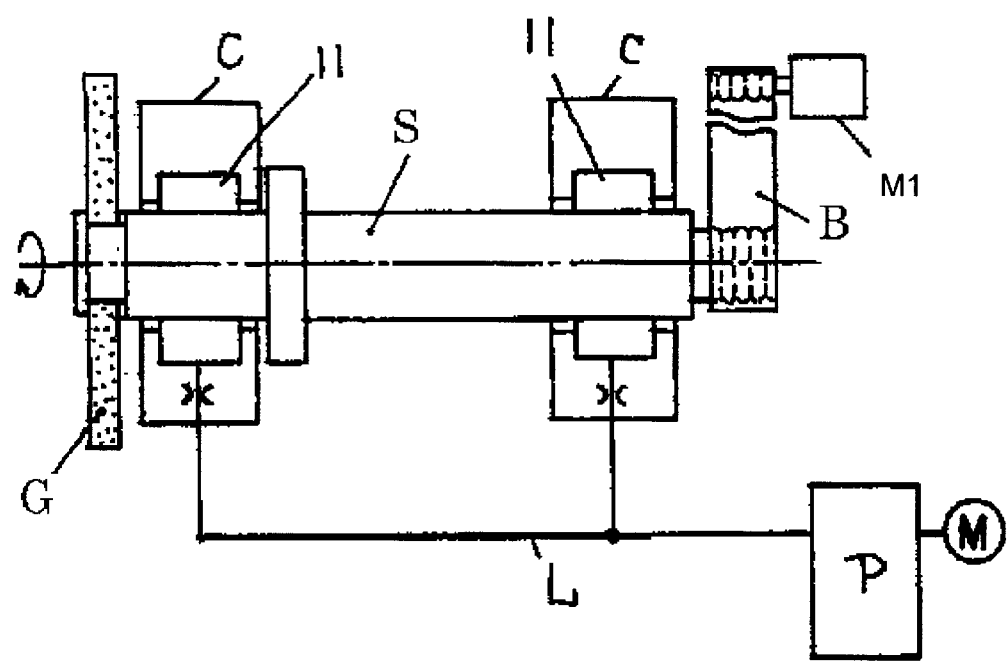
FIG. 3 is a schematic illustration of a wheel spindle apparatus of a grinding machine according to the first embodiment of the present invention.
Figure 4:
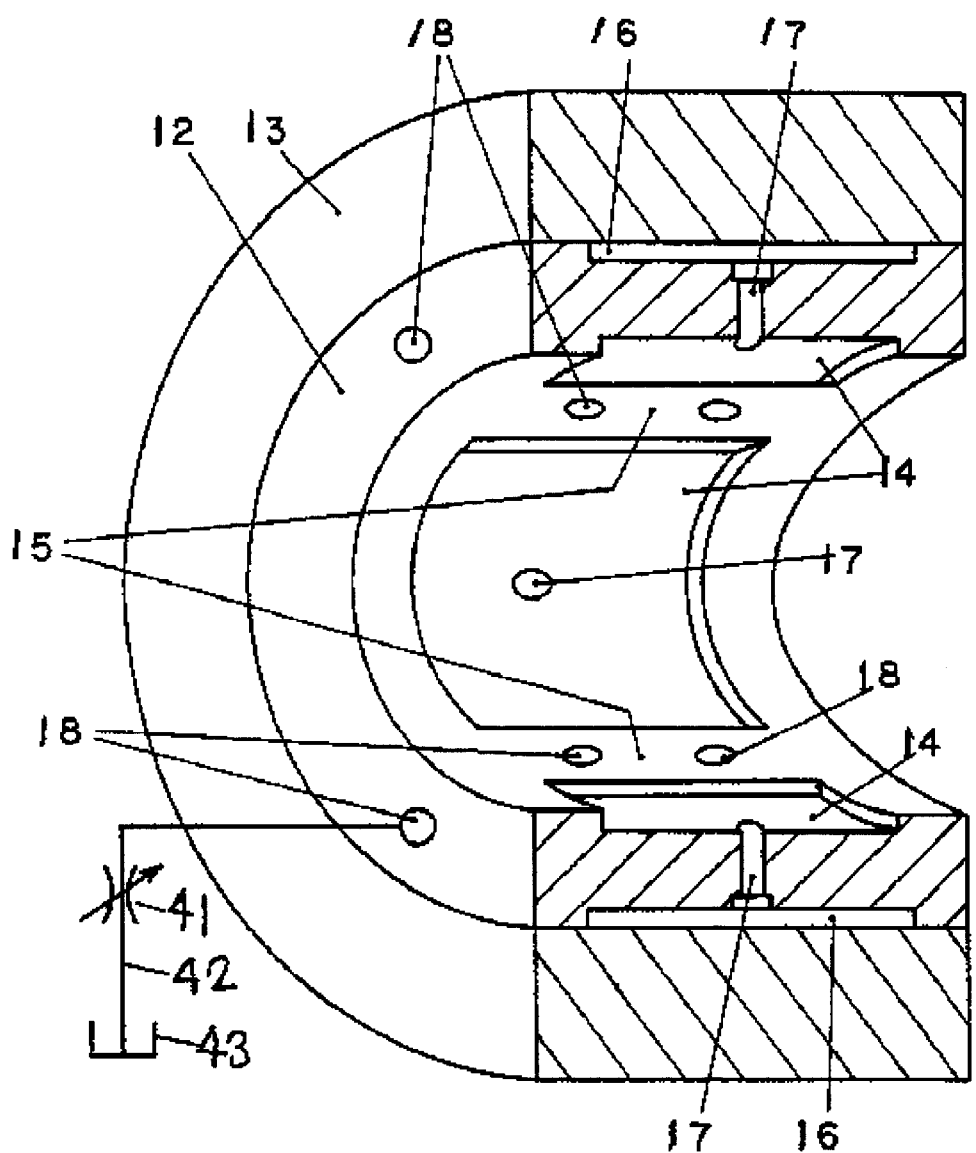
FIG. 4 is a sectional perspective view of a bearing metal according to the first embodiment of the present invention.
Figure 5A:
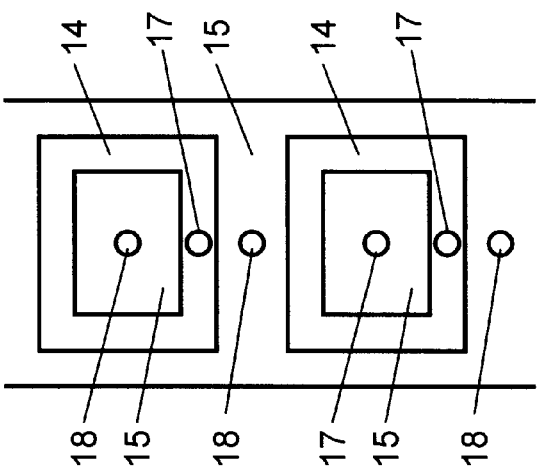
FIGS. 5(A), 5(B) and 5(C) are partially developments of inner surfaces of the bearing metals according to the first embodiment of the present invention.
Figure 5B:
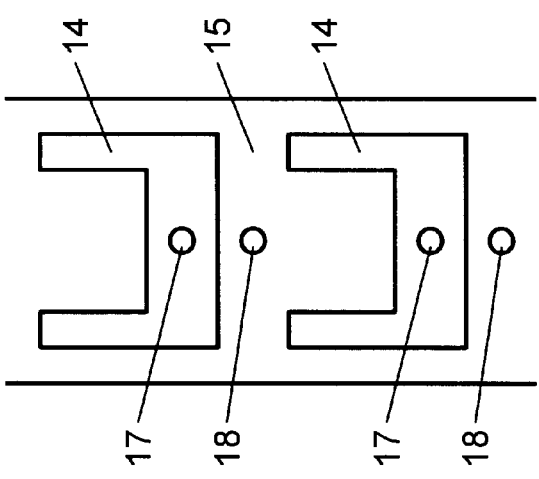
Figure 5C:
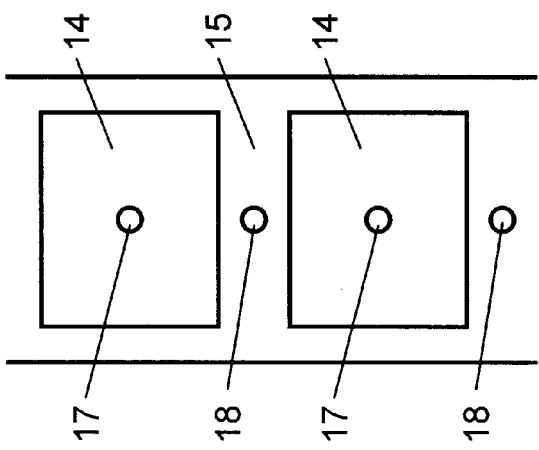

Preferred embodiments of a hydraulic bearing device according to the invention will be described hereinafter with reference to the accompanying drawings. A radial hydraulic bearing device of according to the present invention is employed, for instance, in a wheel spindle apparatus of a grinding machine as illustrated in FIG. 3. The radial hydraulic bearing devices 11 are arranged to support a wheel spindle S at inner surfaces thereof. At one end of the wheel spindle S, a grinding wheel G is attached. A driving belt B is strung between another end of the wheel spindle S and a motor M1, and the wheel spindle S is rotated by the motor M1. Referring to FIG. 4, the radial hydraulic bearing device 11 comprises a ring shape inner sleeve 12 as a bearing metal and a bearing case 13 that the inner sleeve 12 is fixed therein by such as manners of a shrinkage fit or a press fit. Plural hydrostatic pockets 14 are formed on an internal circumference surface of the inner sleeve 12 in a circumference direction and are equally distant from each other. As a shape of the hydraulic pockets 14, for example, quadrilateral groove shown by FIG. 5(A), U-shape groove which has leg portions extended in rotational direction of the wheel spindle S shown by FIG. 5(B) or quadrangular ring shape groove that a land portion is formed at a center thereof shown by FIG. 5(C) are applicable. A land portion 15 for generating hydrodynamic pressure is defined as a portion or portions except hydrostatic pockets 14 from the internal circumference surface of the inner sleeve 12. At a center of the each hydrostatic pocket 14, one end of an oil-supplying hole 17 which has a throttle nozzle (not shown in Figures) is opened. The other end of the oil supplying hole 17 is connected with a oil supplying pass 16 that is defined by a circumference groove formed on a outer surface of the inner sleeve 12 and an inner surface of the bearing case 13. The oil-supplying pass 16 is connected with a pump P, which is driven by a motor M, via an outside supplying pipe L. At an inside of the inner sleeve 12, plural drain holes 18 are formed. One end of the each drain hole 18 is opened on the land portion 15, and the other end of the each drain hole 18 is connected with a tank 43 via an outside drain pipe 42. As a disposition of the drain hole 18, for example, single drain hole 18 disposed between each hydrostatic pocket 14 such as shown by FIGS. 5(A), 5(B) and 5(C), or double drain holes 18 disposed between each hydrostatic pocket 14 shown by FIGS. 6(A), 6(B) and 6(C) are applicable. In a case of the quadrangular ring shape groove shown by FIG. 5(C) or FIG. 6(C), it is preferable that another drain hole 18 is disposed in the center land portion that is surrounded with the quadrangular ring shape groove. A metering orifice 41 such as an electromagnetic variable valve is disposed on a way of the outside drainpipe 42.

At above described radial hydraulic bearing device 11, when lubricant oil is supplied to the supplying pass 16 by the pump P through the outside supplying pipe L, pressure of the lubricant oil is adjusted by the throttle nozzle. The pressure adjusted lubricant oil is filled in the hydrostatic pockets 14. Therefore, the hydrostatic pockets 14 generate hydrostatic pressure and the wheel spindle S is supported for the bearing metal by the hydrostatic pressure. That is, the hydraulic bearing device 11 functions as a hydrostatic bearing. Besides, the lubricant oil filled in the hydrostatic pockets 14 flows out between the land portion 15 and an outer surface of the wheel spindle S. When the wheel spindle S is rotated relative to the bearing metal, hydrodynamic pressure is generated by edge effect of the lubricant oil that is between the land portion 15 and the outer surface of the wheel spindle S. That is, the hydraulic bearing device 11 functions as a hydrodynamic bearing. Then, the lubricant oil is drained to each side of the bearing metal. In addition, the lubricant oil is drained from the drain hole 18 to the tank 43 through the outside drainpipe 42 and metering orifice 41.

Figure 7:
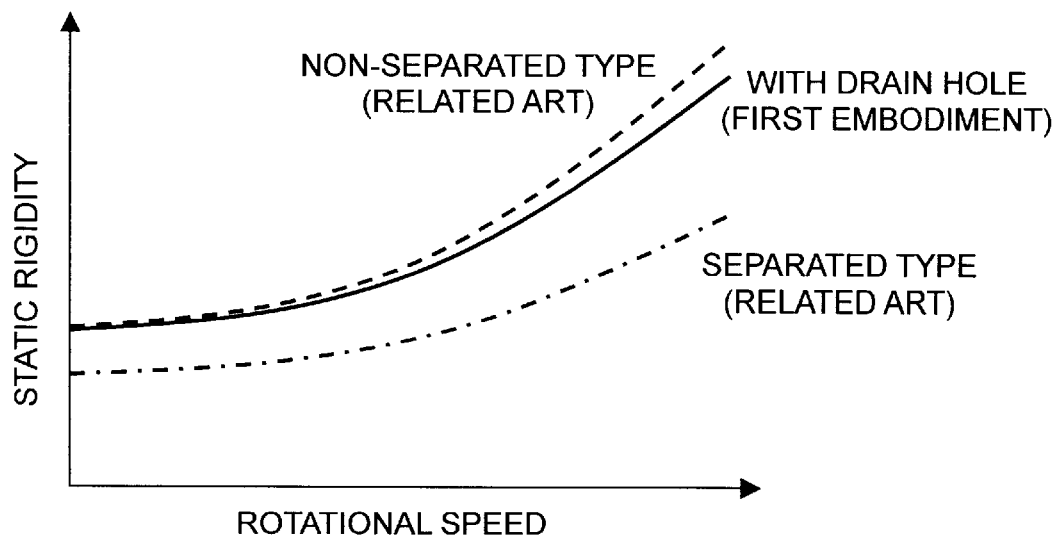
FIG. 7 is a graph showing relations between rotational speed of a wheel spindle and static rigidity of radial hydraulic bearings.
Figure 8:
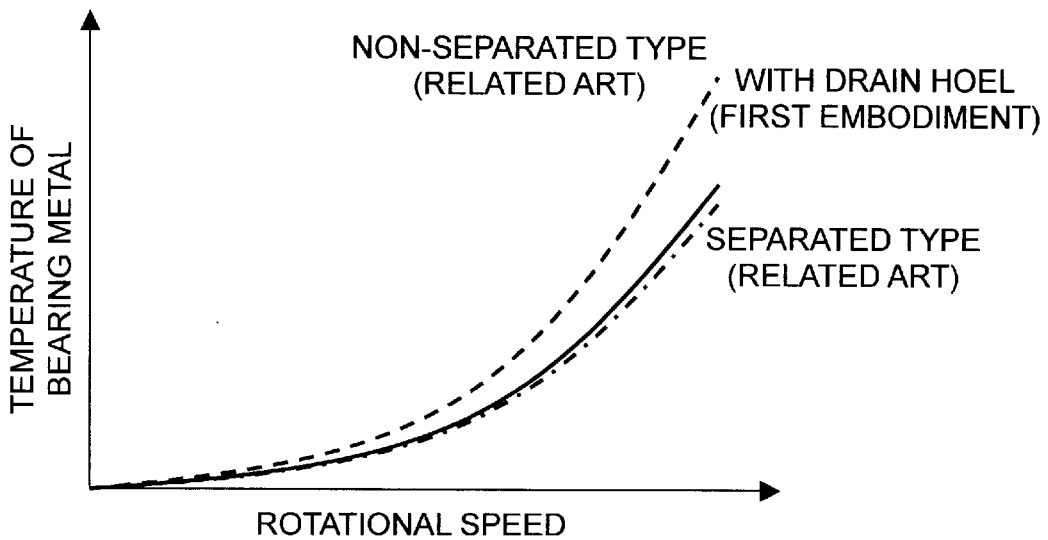
FIG. 8 is a graph showing relations between rotational speed of a wheel spindle and temperature of bearing metals of radial hydraulic bearings.
Figure 9:
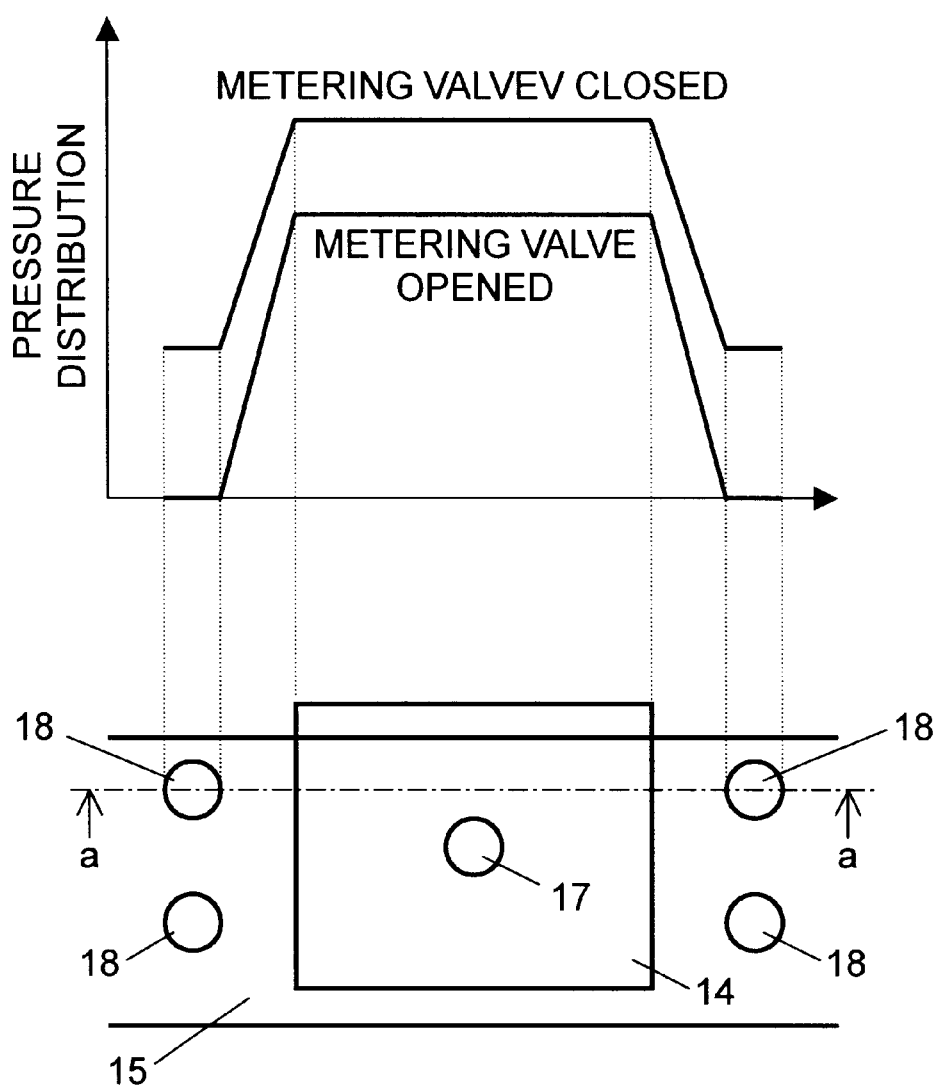
FIG. 9 is graph showing pressure distribution on an inner surface of a bearing metal according to the first embodiment of the present invention.

According to the hydraulic bearing device 11 of the first embodiment, since the lubricant oil is drained with not only each side of the bearing metal but also through the drain holes 18, drainage efficiency of the lubricant oil is improved. As the result, thermal expansion of the bearing metal due to heat generating at the land portion 15 is restrained. Then, since the drain holes 18 do not interrupt continuation of the land portion 15 like the drain grooves 7 of the related art, deterioration of bearing rigidity is restrained. That is, the hydraulic bearing device 11 of the first embodiment has a capacity of static rigidity that is close to the same of the non-separated type bearing as shown by FIG. 7, and has temperature rise that is close to the same of the separated type bearing as shown by FIG. 8.

Further, according to the hydraulic bearing device of the first embodiment, since the metering orifice 41 is disposed in the outside drainpipe 42, it is possible that bearing rigidity is controlled to adjust an opening of the metering orifice 42. That is, as shown FIG. 10, since pressure distribution at the bearing metal changes according to opening of the metering orifice 42, it is possible to control as follows: when high rigidity is required such as machining time by the grinding wheel G, bearing rigidity is increased by closing the metering orifice 42; when high rigidity is not require such as an idle time of the machining, thermal expansion of the bearing metal is decreased by opening the metering orifice 42.

Moreover, since a capacity of static rigidity and thermal expansion can be controlled by the metering orifice 41, a range of specification of the bearing device spreads. In the result, a freedom of a design for the bearing device increases.

Figure 10A:
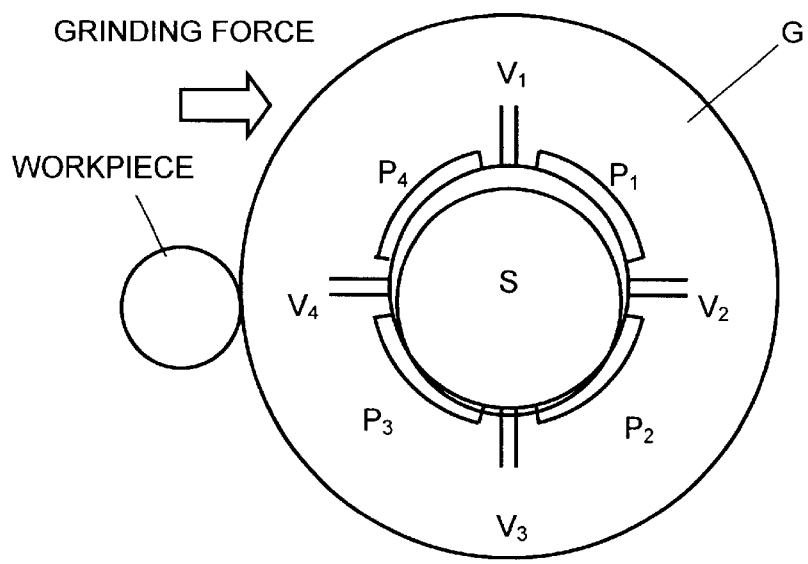
FIG. 10(A) is a sectional view of a wheel spindle showing a direction of grinding force.
Figure 10B:
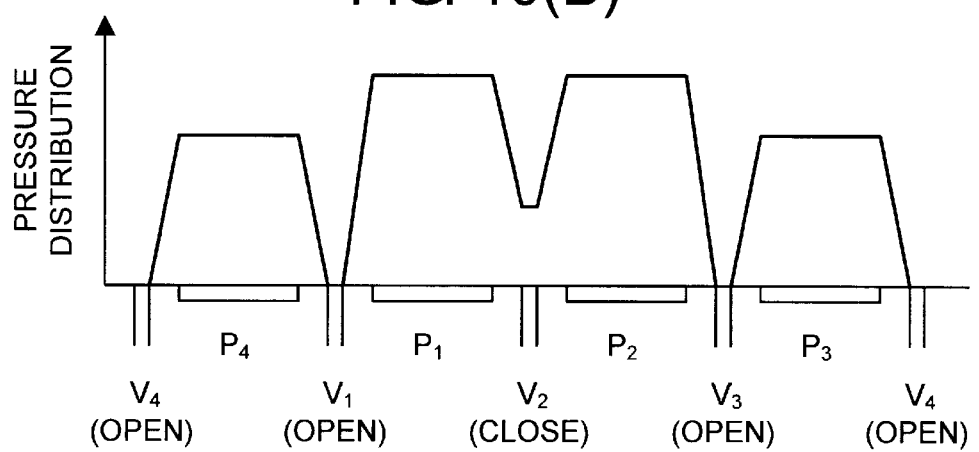
FIG. 10(B) is a graph showing a relation between pressure distribution on an inner surface of a bearing metal and a position of a hydraulic pocket relative to the direction of grinding force according to the first embodiment of the present invention.

Furthermore, in a case of that the metering orifice 42 is installed relative to each drain hole 18, opening of each metering orifice 42 is adjustable individually. For example, at the wheel spindle apparatus of the grinding machine, the wheel spindle S receives a load, which is grinding resistance, in constant direction as shown by an arrow of FIG. 10(A). Therefore, it is possible that bearing rigidity relative to load acting direction is increased to close the metering orifices $V_2$ relative to load receiving direction, thermal expansion of the bearing metal is decreased to open another valves $V_1$, $V_3$, $V_4$ as shown by FIGS. 10(A) and 10(B).

In addition, since pressure in the drain hole 18 does not become negative pressure by existence of the metering orifice 42, generating cavitation at the drain hole 18 is prevented.

Second Embodiment

Figure 11:
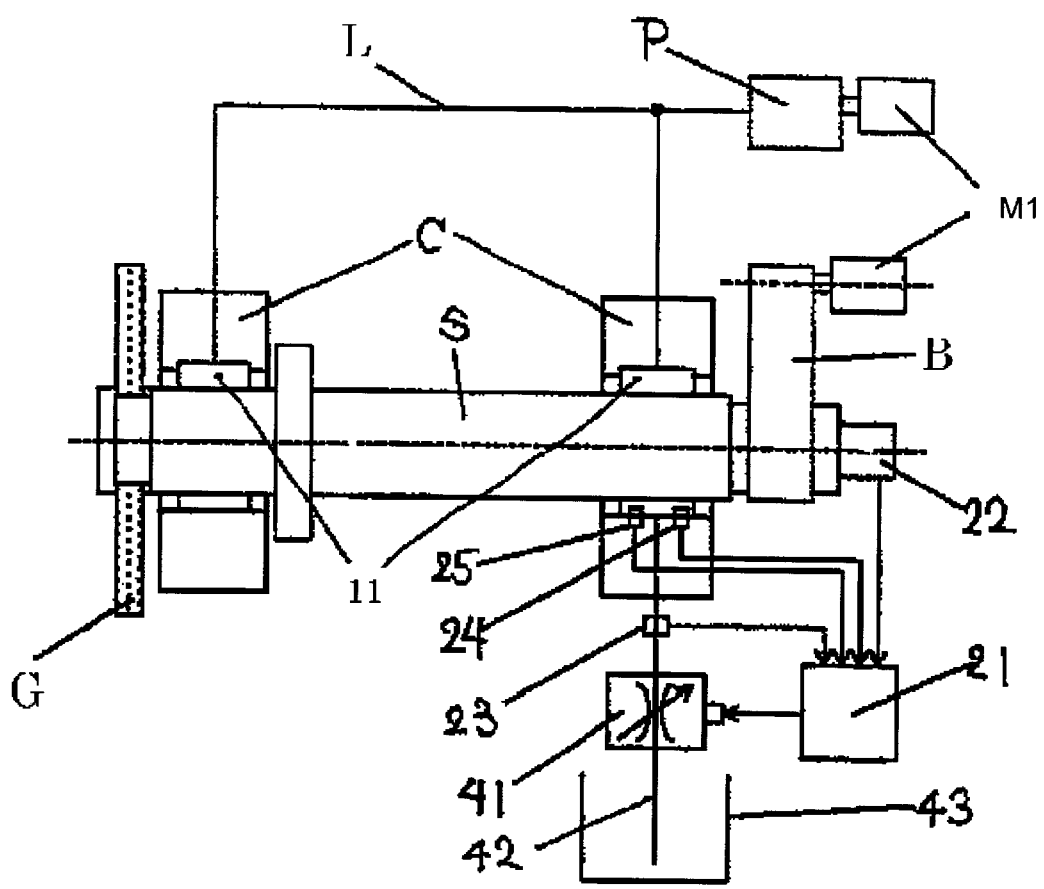
FIG. 11 is a schematic illustration of a wheel spindle apparatus of a grinding machine according to the second embodiment of the present invention.

Explanation for the second embodiment that is same constitution as the first embodiment is omitted. Referring to FIG. 11, sensors are prepared for a wheel spindle apparatus of the second embodiment in addition to the constitution of the first embodiment. An encoder 22 is attached on an end face of the wheel spindle S to measure rotating speed of the wheel spindle S. A temperature sensor 23 is attached on a way of the outside drainpipe 42 to measure temperature of the drained lubricant oil. A pressure gauge 24 is attached in the hydrostatic pocket 14 to measure pressure therein. A displacement sensor 25 is disposed between the inner sleeve 12 and wheel spindle S to measure a clearance therebetween. Each of sensors 22, 23, 24 and 25 is connected electrically to a controller 21, and output therefrom is input to the controller 21. The controller 21 is connected electrically to the metering orifice 41 to control opening of the metering orifice 41. Here, all sensors are not required to be installed, it is possible that one or some sensors is/are installed selectively.

Figure 12:
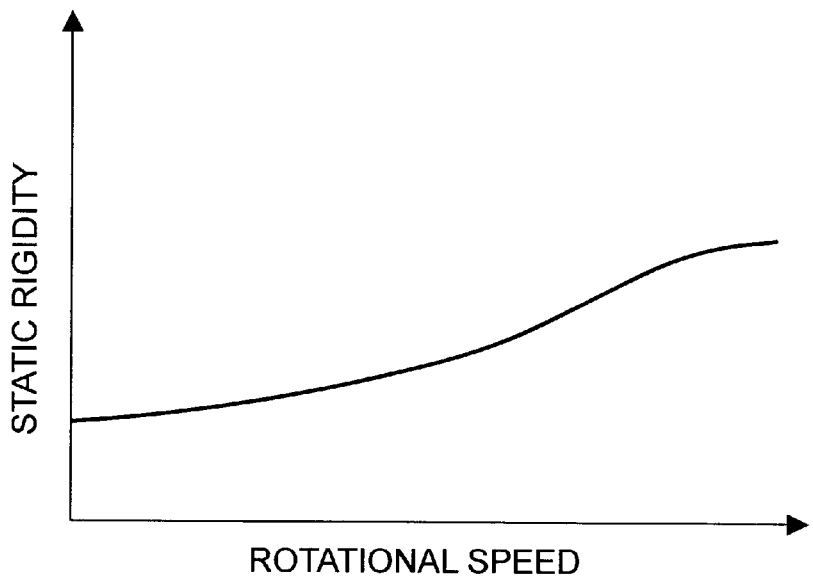
FIG. 12 is a graph showing a relation between rotational speed of a wheel spindle and static rigidity of a hydraulic bearing according to the second embodiment of the present invention.
Figure 13:
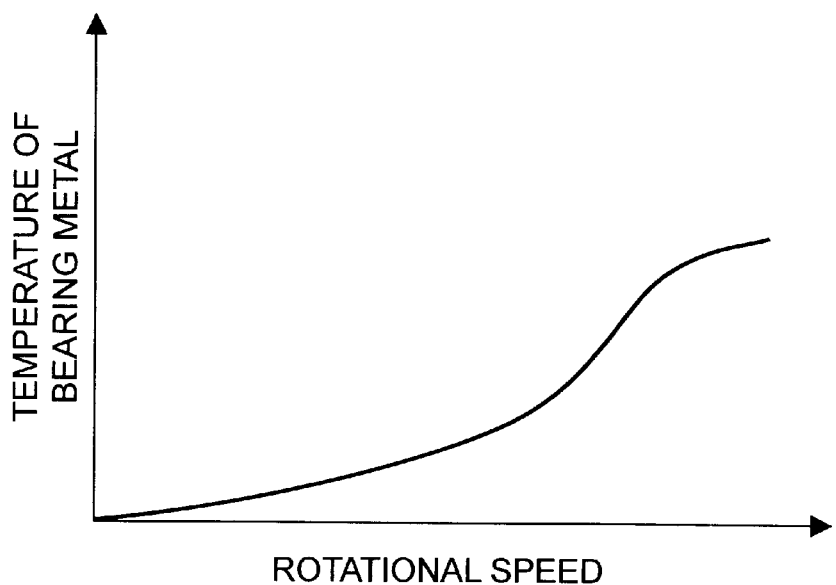
FIG. 13 is a graph showing a relation between rotational speed of a wheel spindle and temperature of a bearing metal according to the second embodiment of the present invention.
Figure 14:
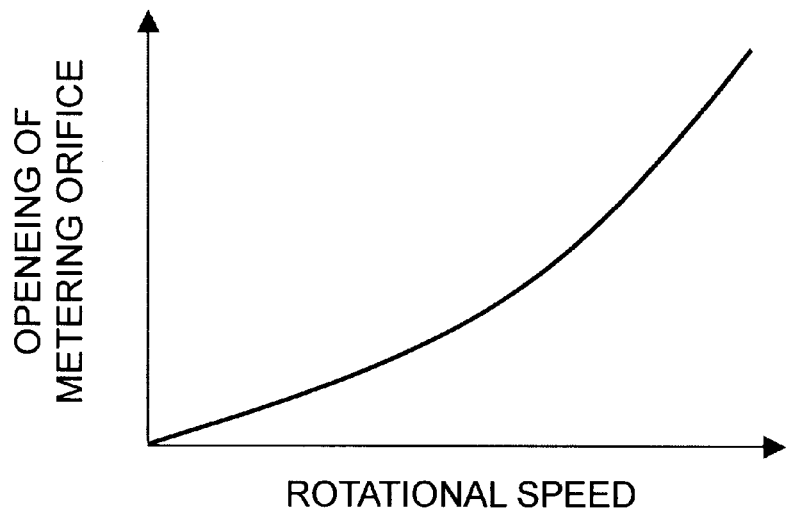
FIG. 14 is a graph showing a relation between rotational speed of a wheel spindle and opening of a metering orifice according to the second embodiment of the present invention.
Figure 15:
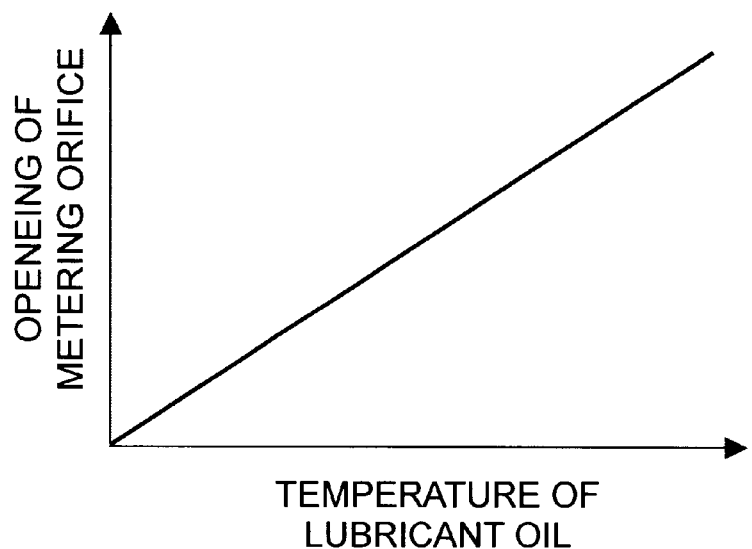
FIG. 15 is a graph showing a relation between temperature of lubricant oil and opening of a metering orifice according to the second embodiment of the present invention.
Figure 16A:
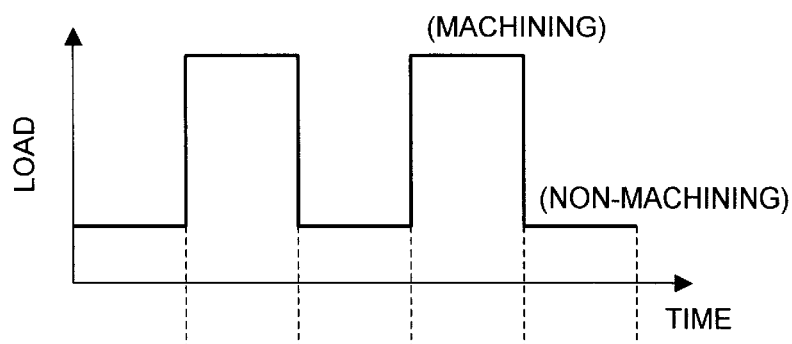
FIG. 16 is a time chart to explain a relation between load acting to a wheel spindle and opening of a metering orifice according to the second embodiment of the present invention.
Figure 16B:
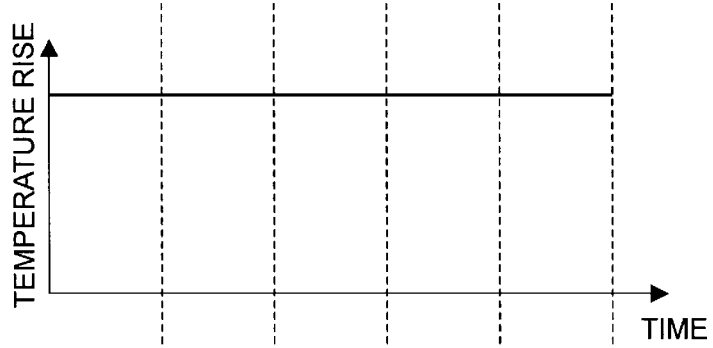
Figure 16C:
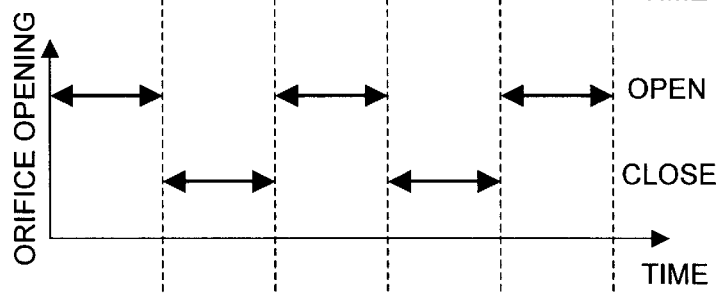
Figure 16D:
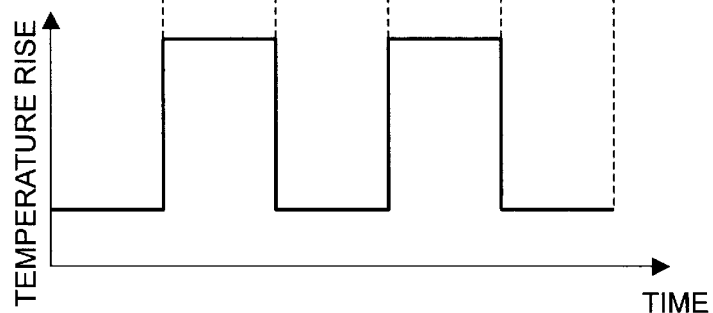

At above described second embodiment, controller 21 controls opening of the metering orifice 41 according to the output of the sensors 22, 23, 24 and 25. As shown by FIG. 12, static rigidities of the first embodiment increase according to increasing of rotational speed of the wheel spindle S, because hydrodynamic pressure increase according to increasing of rotational speed. Simultaneously, temperature of the bearing metal increases according to rotational speed as shown by FIG. 13. Then, in the second embodiment, the controller 21 controls opening of the metering orifice 41 according to rotational speed of the wheel spindle S as a relationship of opening of the metering orifice 41 with rotational speed of the wheel spindle S shown by FIG. 14. Therefore, increase of the rigidity more than necessity is restrained shown by FIG. 12, and increase of the temperature of the bearing metal is restrained shown by FIG. 13. Similarly, as shown by FIG. 15, opening of the metering orifice 41 can be controlled according to temperature of the lubricant oil that is measured by the temperature sensor 23. As another control mode of the metering orifice 41, it is possible that the metering orifice 41 is controlled according to pressure in the hydrostatic pockets 14 that is measured by the pressure gauge 24, or a clearance between the inner sleeve 12 and wheel spindle S that is measured by the displacement sensor 25. For example, at the wheel spindle S of the grinding machine, machining resistance that acts to the wheel spindle S changes intermittently to repeat machining cycles as shown by FIG. 16(A). Then, at the bearing device of the related art, temperature of the bearing metal rises constantly regardless of load fluctuation as shown by FIG. 16(B). However, temperature rise more than necessity is restrained as shown by FIG. 16(D) by controlling opening of the metering orifice 41 as shown by FIG. 16(C) according to pressure in the hydrostatic pockets 14 measured by the pressure gauge 24.

According to the hydraulic bearing device of the second embodiment, in addition to the effects of the first embodiment, a balance with bearing rigidity and temperature rise can be adjusted suitably to control opening of the metering orifice 41 according to rotational speed of the wheel spindle S, temperature of the lubricant oil, pressure in the hydrostatic pockets or clearance between the wheel spindle S and the land portion 15.

Third Embodiment

Figure 17:
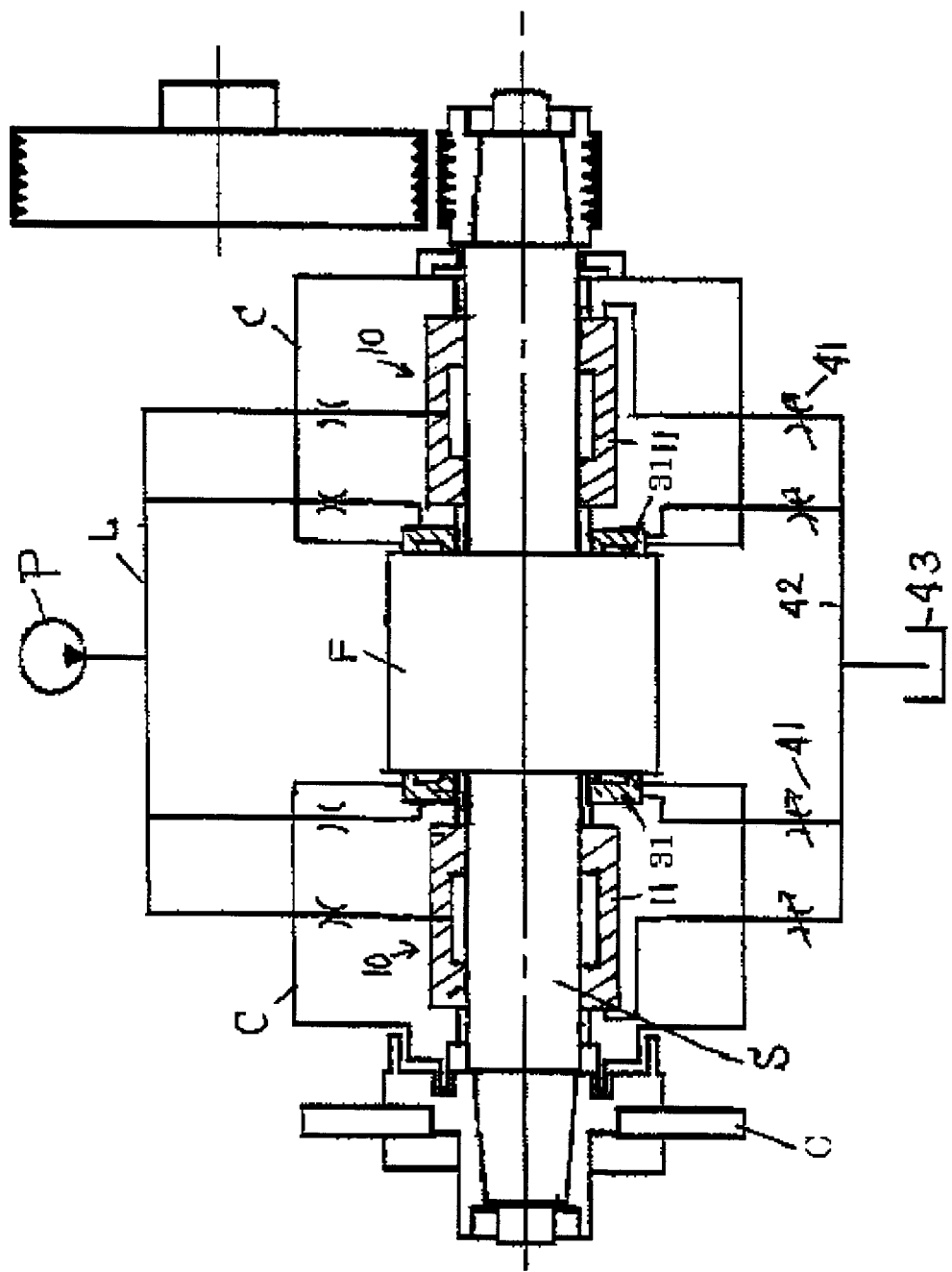
FIG. 17 is a schematic illustration of a wheel spindle apparatus of a grinding machine according to the third embodiment of the present invention.
Figure 18:
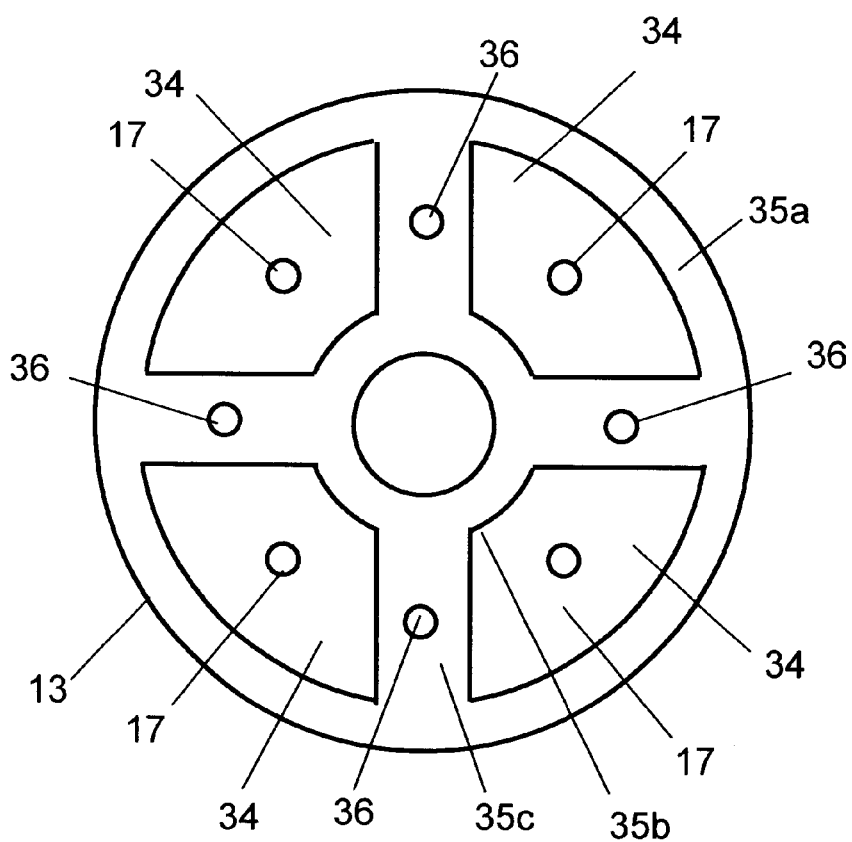
FIG. 18 is a plain view of a bearing metal of a thrust bearing device according to the third embodiment of the present embodiment.

At third embodiment, the present invention is applied to a thrust hydraulic bearing device. As shown FIG. 17, a flange portion F is formed in a center of a wheel spindle S. A front and a rear thrust bearing metals 31 are arranged to oppose to end surfaces of the flange portion F each other. Each thrust beating metal 31 is ring shape formed a center hole 32 that the wheel spindle S penetrates therein, and fixed on a bearing case C. It is possible to form directly a bearing metal on end surfaces of the bearing case C. As shown FIG. 18, four hydrostatic pockets 34 that are separated ring shape grooves are formed on a surface of the bearing metal 31 which is opposed to the end surface of the flange portion F. Portions of the surface of the bearing metal 31 except the hydrostatic pockets 34 are land portions 35 to generate hydrodynamic pressure. The land portions 35 are consist of an outer land portion 35a, an inner land portions 35b and spoke land portions 35c that are formed between each hydrostatic pockets 34. An oil-supplying hole 17 which has a throttle nozzle (not shown in Figures) is opened into each hydrostatic pocket 34. The other end of the oil-supplying hole 17 is connected with a pump P through an inner portion of the bearing case C. On the spoke land portion 35c, drain holes 36 like the drain holes 18 in the first and second embodiment are formed. Similarly with the first embodiment and the second embodiment, the other end of the drain holes 36 is connected with a tank 43 through a metering orifice 41 such as a an electromagnetic variable valve.

At above described thrust hydraulic bearing device, when lubricant oil whose pressure is adjusted by the throttle nozzle is supplied to the hydrostatic pockets 34 through the oil-supplying hole pass 17, the pressure adjusted lubricant oil is filled in the hydrostatic pockets 34. Therefore, the hydrostatic pockets 34 generate hydrostatic pressure and the wheel spindle S is supported for the bearing metal 31 by the hydrostatic pressure. That is, the hydraulic bearing device functions as a hydrostatic bearing. Besides, the lubricant oil filled in the hydrostatic pockets 34 flows out between the land portion 15 and the end surface of the flange portion F. When the wheel spindle S is rotated relative to the bearing metal 31, hydrodynamic pressure generated by edge effect of the lubricant oil that is between the land portion 35 and the end surface of the flange portion F. That is, the hydraulic bearing device functions as a hydrodynamic bearing. Then, the lubricant oil is drained to inner and outer sides of the bearing metal 31. In addition, the lubricant oil is drained from the drain hole 36 to the tank 43 through metering orifice 41.

Figure 19:
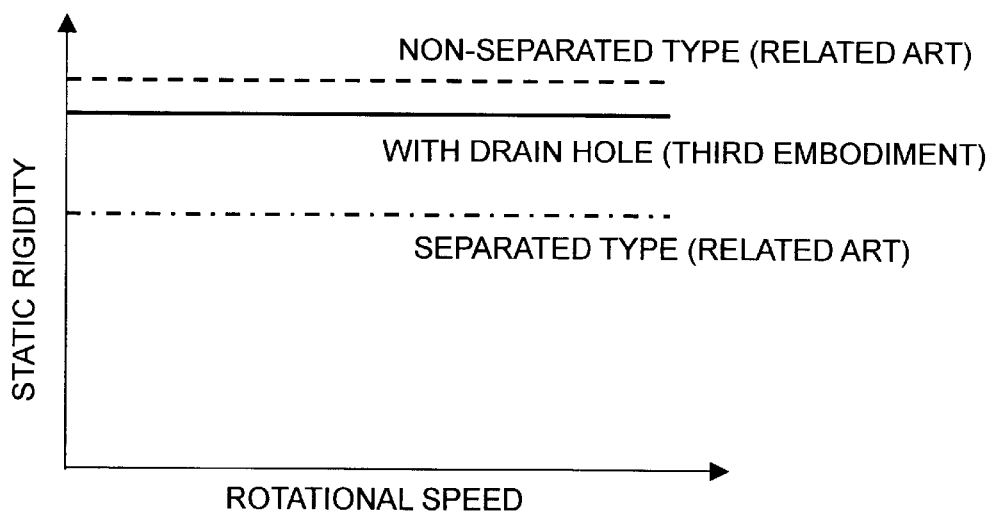
FIG. 19 is a graph showing relations between rotational speed of a wheel spindle and static rigidity of thrust hydraulic bearings.
Figure 20:
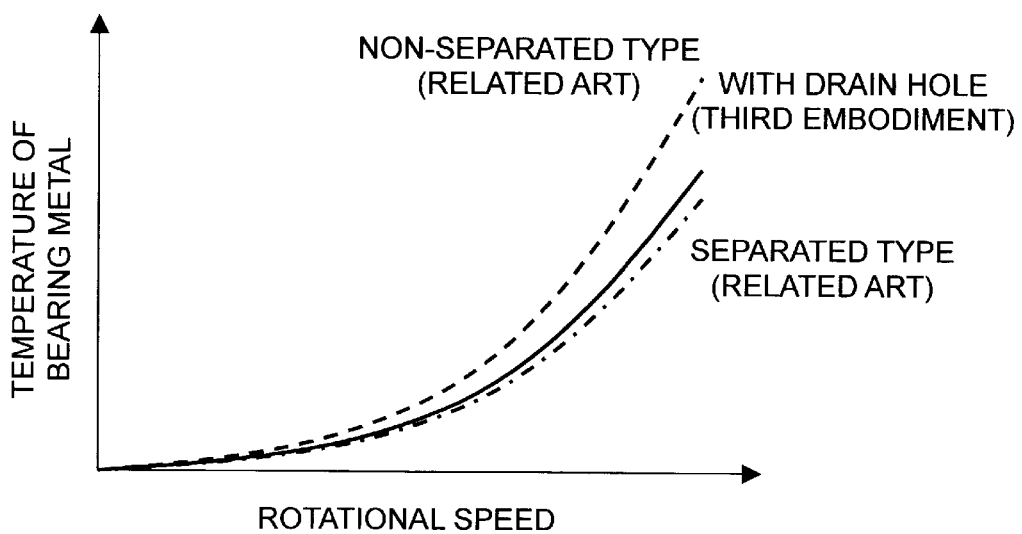
FIG. 20 is a graph showing relations between rotational speed of a wheel spindle and temperature of bearing metals of thrust hydraulic bearings.

According to the third embodiment, since the lubricant oil is drained with not only each side of the bearing metal but also through the drain holes 36, drainage efficiency of the lubricant oil is improved. As the result, thermal expansion of the bearing metal 31 due to heat generating at the land portion 35 is restrained. Then, since the drain holes 36 do not interrupt continuation of the land portion 36 like the drain grooves 7 of the related art, deterioration of bearing rigidity is restrained. That is, the hydraulic bearing device of the third embodiment has a capacity of static rigidity that is close to the same of the non-separated type bearing as shown by FIG. 19, and has temperature rise that is close to the same of the separated type bearing as shown by FIG. 20.

Further, according to the hydraulic bearing device of the third embodiment, since the metering orifice 41 is disposed in the outside drainpipe 42, it is possible that bearing rigidity is controlled to adjust an opening of the metering orifice 42.

Moreover, since a capacity of static rigidity and thermal expansion can be controlled by the metering orifice 41, a range of specification of the bearing device spreads. In the result, a freedom of a design for the bearing device increases.

Furthermore, in a case of that the metering orifice 42 is installed relative to each drain hole 36, opening of each metering orifice 42 is adjustable individually.

In addition, since pressure in the drain hole 36 does not become negative pressure by existence of the metering orifice 42, generating cavitation at the drain hole 36 is prevented.

It is possible that the sensors like the second embodiment are installed to the third embodiment. Then, the thrust bearing device of third embodiment provides same effects with the second embodiment.

Obviously, numerous modifications and variations of the present invention are possible in light of the above teaching. It is therefore to be understood that within the scope of the appended claims, the present invention may be practiced otherwise than as specifically described herein.

What is claimed is:

1. A hydraulic bearing device that supports a rotating shaft comprising:
   a bearing metal;
   a hydrostatic pocket formed on a surface of the bearing metal;
   a land portion formed on the surface of the bearing metal and defined by the hydrostatic pocket, which generates hydrodynamic pressure;
   a pressure fluid supplying source;
   an oil-supplying hole opened in the hydrostatic pocket and providing pressure fluid from the pressure fluid supplying source to the hydrostatic pocket; and
   a drain hole formed on the land portion and draining the fluid.

2. The hydraulic bearing device according to claim 1 further comprising a metering orifice connected to the drain hole.

3. The hydraulic bearing device according to claim 2, wherein the metering orifice is a variable valve.

4. The hydraulic bearing device according to claim 3, further comprising at least one sensor, wherein opening of the variable valve is controlled in response to output from the sensor.

5. The hydraulic bearing device according to claim 4, wherein the sensor is one of a speed sensor to measure rotational speed of the rotating shaft, a temperature sensor to measure temperature of the fluid, a pressure sensor to measure fluid pressure in the hydrostatic pocket, and a displacement sensor to measure a clearance between the bearing metal and the rotating shaft.

6. The hydraulic bearing device according to claim 4, wherein the at least one sensor is a plurality of sensors which are a combination of two or more of a speed sensor to measure rotational speed of the rotating shaft, a temperature sensor to measure temperature of the fluid, a pressure sensor to measure fluid pressure in the hydrostatic pocket and a displacement sensor to measure a clearance between the bearing metal and the rotating shaft.

7. The hydraulic bearing device according to claim 2, wherein the drain hole is a plural number of drain holes formed in a rotational direction of the rotating shaft and each of the drain holes is connected with the metering orifice individually.

8. The hydraulic bearing device according to claim 1, wherein the bearing metal is cylindrical shape for supporting an outer surface of the rotating shaft.

9. The hydraulic bearing device according to claim 8, wherein the hydrostatic pocket has a plural number of quadrilateral-shaped grooves and the drain hole is formed on the land portion between each of the U-shaped grooves of the hydrostatic pocket.

10. The hydraulic bearing device according to claim 8, wherein the hydrostatic pocket has a plural number of U-shaped grooves and the drain hole is formed on the land portion between each of the U-shaped grooves of the hydrostatic pocket.

11. The hydraulic bearing device according to claim 8, wherein the hydrostatic pocket has a plural number of quadrangular-shaped grooves and the drain hole is formed on the land portion between each of the quadrangular-shaped grooves of the hydrostatic pocket.

12. The hydraulic bearing device according to claim 1, wherein the bearing metal is ring-shaped for supporting an surface perpendicular to a rotational axis of the rotating shaft.

13. The hydraulic bearing device according to claim 12, wherein the hydrostatic pocket has a ring-shape groove.

14. The hydraulic bearing device according to claim 12, wherein the hydrostatic pocket has a plural number of partly ring-shaped grooves and the drain hole is formed on the land portion between each of the partly ring-shaped grooves of the hydrostatic pocket.

15. A radial hydraulic bearing device that supports an outer surface of a rotating shaft comprising:
   a cylindrical bearing metal;
   a plural number of hydrostatic pockets formed on an inner circumferential surface of the bearing metal;
   a land portion formed on the inner circumferential surface of the bearing metal and defined by the hydrostatic pockets, which generates hydrodynamic pressure;
   a pressure fluid supplying source;

an oil-supplying hole opened in each of the hydrostatic pockets and providing pressure fluid from the pressure fluid supplying source to each of the hydrostatic pockets;

a drain hole formed on each land portion between each of the hydrostatic pockets and draining the fluid; and a variable valve connecting with the drain hole.

16. A thrust hydraulic bearing device that supports a surface perpendicular to rotational axis of a rotating shaft comprising:

a ring-shaped bearing metal;

a plural number of hydrostatic pockets formed on an end surface of the bearing metal;

a land portion formed on the end surface of the bearing metal and defined by each of the hydrostatic pockets, which generates hydrodynamic pressure;

a pressure fluid supplying source;

an oil-supplying hole opened in each of the hydrostatic pockets and providing pressure fluid from the pressure fluid supplying source to each of the hydrostatic pockets;

a drain hole formed on the land portion between each of the hydrostatic pockets and draining the fluid; and a variable valve connecting with the drain hole.

* * * * *